United States Patent [19]

Kolstein

[11] 4,029,327

[45] June 14, 1977

[54] STROLLER FOR ATTACHMENT TO A CARRYING CASE

[76] Inventor: Samuel Kolstein, 2801 Shore Drive, Merrick, N.Y. 11566

[22] Filed: Apr. 27, 1976

[21] Appl. No.: 680,742

[52] U.S. Cl. ...................... 280/47.13 R; 190/18 A; 280/47.22
[51] Int. Cl.² .......................................... B62B 3/02
[58] Field of Search ................ 280/47.13, 39, 79.1, 280/47.22; 190/18 A

[56] References Cited

UNITED STATES PATENTS

| | | | |
|---|---|---|---|
| 2,344,272 | 3/1944 | Sestan | 190/18 A |
| 2,805,077 | 9/1957 | Katz | 190/18 A X |
| 3,809,231 | 5/1974 | Palma | 190/18 A X |
| 3,861,703 | 1/1975 | Gould | 190/18 A X |

Primary Examiner—Joseph F. Peters, Jr.
Assistant Examiner—R. Schrecengost
Attorney, Agent, or Firm—McAulay, Fields, Fisher & Goldstein

[57] ABSTRACT

A stroller for attachment to a carrying case which includes a mounting plate and a wheel support plate interconnected by a plurality of shock absorbing members. A plurality of wheels are rotatably mounted on the support plate for 360° swivel movement. Interengaging fastening members are provided having portions respectively on the mounting plate and the carrying case for removably attaching the stroller to the case. The stroller further includes cushioning members on the mounting plate engageable with the carrying case in the region of attachment.

17 Claims, 10 Drawing Figures

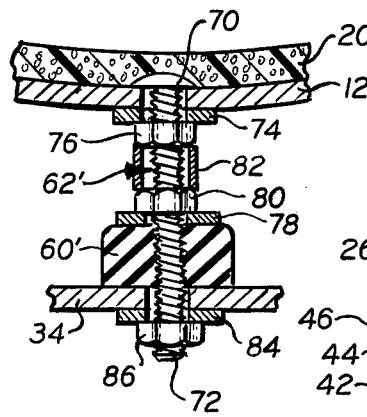
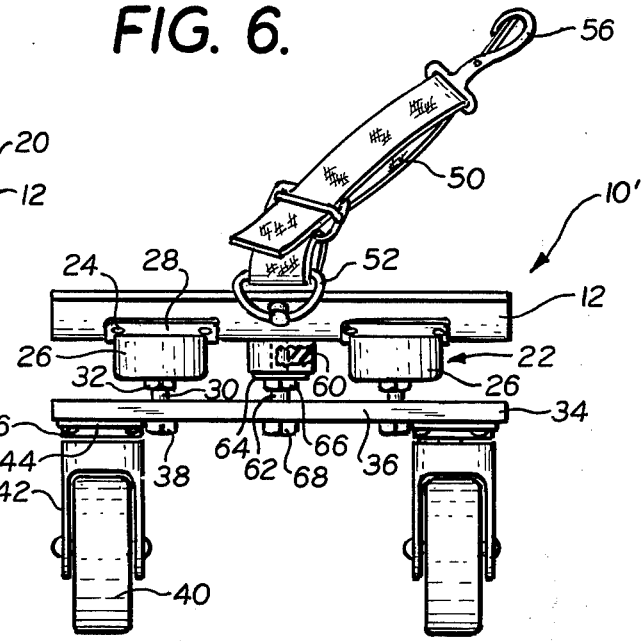
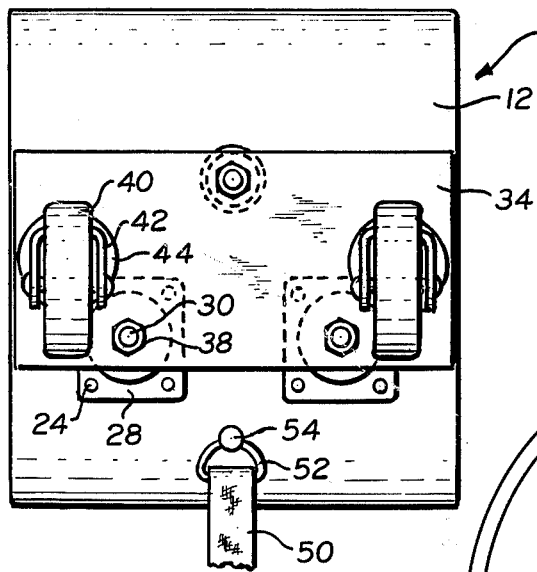
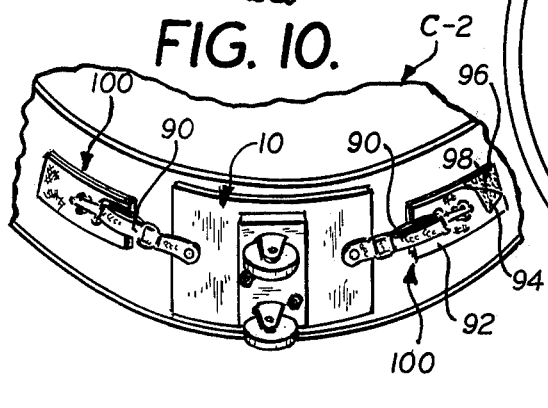
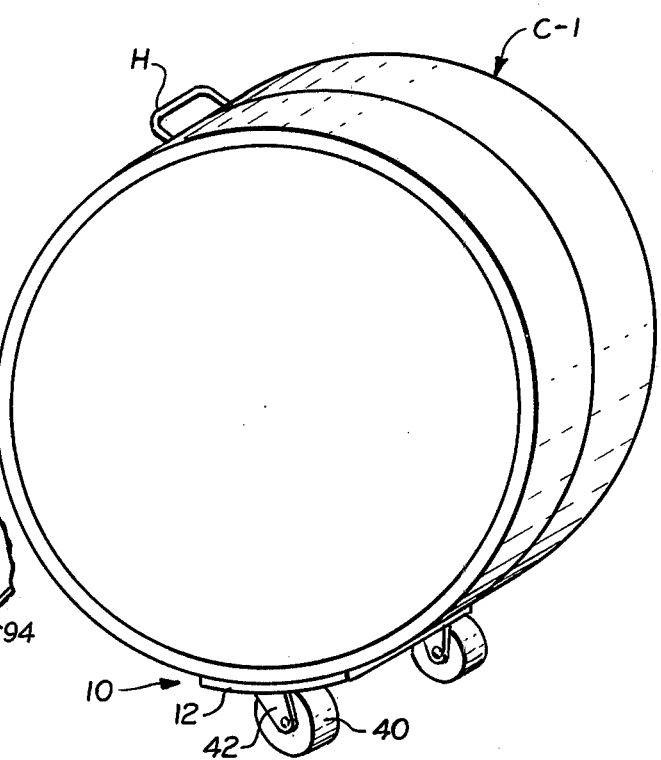

4,029,327

STROLLER FOR ATTACHMENT TO A CARRYING CASE

BACKGROUND OF THE INVENTION

1. Field of the Invention

This invention relates generally to a stroller for attachment to a case for transporting an article therein and, more particularly, to a stroller adapted to be mounted to the carrying case of a musical instrument to facilitate the manual transportation of said instrument.

2. Description of the Prior Art

The transportation of large musical instruments, such as the bass violin, cello, bass drum or the like, from one place of performance to another has traditionally presented problems due to their large size and weight. In those instances where the instrument is to be transported over large distances, such as cross-country, it is usually enclosed within a hard or rigid-type case and shipped via common carrier. The hard-type case may be provided with wheels to facilitate manual movement. In other instances where the instrument is to be transported locally within the same or nearby cities, it is usually enclosed within a soft or flexible-type case and carried by the musician from one performance to another. In order to facilitate manual movement of such case, a wheel assembly may be mounted to the instrument, which assembly passes through an opening in the case. For example, in the case of the bass violin, the end pin of the instrument passes through an opening in the soft-type case and is adapted to receive a spring biased wheel therein. Typical examples of previously patented carriers adapted to be connected to various kinds of carrying cases are disclosed in the following identified U.S. Pat. Nos: 492,028; 1,413,852; 2,613,952; 2,670,969; 2,845,155; and 3,809,231.

The disadvantages of the strollers disclosed in the aforesaid known prior art is that they are unwieldly by reason of their size and weight. Furthermore, none of the known strollers incorporate adequate shock absorbing structure so that it is not uncommon for an expensive instrument to be damaged while being transported.

The present invention overcomes the aforesaid problems by providing a lightweight stroller construction adapted to be removably attached to the case, and which exhibits adequate shock absorbing characteristics and ease of mobility to facilitate the safe and easy transporting of the musical instrument being carried within the case.

SUMMARY OF THE INVENTION

The stroller of the present invention is adapted to be attached to a carrying case of either the soft or hard-type construction. The stroller includes a mounting plate having a shape complementary to the shape of the case in the region of attachment. A wheel support plate is positioned below the mounting plate and has a plurality of wheels rotatably mounted thereon for 360° swivel movement. The mounting plate and wheel support plate are interconnected by means of a plurality of shock absorbing members, each of which is operative between a normally extended condition and a compressed condition to effect relative movement of said plates in directions toward and away from each other. In operation, one of said mounting plate or wheel support plate is disposed for movement between a rest position when said shock absorbing members are in their normally extended condition and a displaced position in the direction toward the other one of said plates when the shock absorbing members are in a compressed condition.

Interengaging fastening means are provided having portions respectively on the mounting plate and the carrying case for removably attaching the stroller to the case. A cushioning member is also connected to the mounting plate and is adapted to engage with the case upon attachment of the stroller.

In those instances where the carrying case is of soft-type construction, one or more adjustable straps may be provided having one end connected to the mounting plate and the other end removably connected either to the case or to the instrument being carried within the case. The provision of such strap reduces the likelihood of the case slipping or sliding over the instrument when the stroller is in use.

Accordingly, an object of the present invention is to provide an improved stroller for attachment to the carrying case of a musical instrument to facilitate the safe transporting of the instrument.

Another object and feature of the present invention is to provide a stroller for attachment to a carrying case which is relatively inexpensive to manufacture and easily manipulated for transporting the case.

The above description, as well as further objects, features and advantages of the present invention will be more fully appreciated by reference to the following detailed description of the preferred embodiments of the invention when taken in conjunction with the accompanying drawings.

BRIEF DESCRIPTION OF THE DRAWINGS

FIG. 6 is a view similar to FIG. 1, partly in section and with parts broken away, illustrating another embodiment of the invention;

FIG. 7 is a sectional view, illustrating an alternative construction for the elastomeric annular member shown in FIG. 6;

FIG. 8 is a bottom view of the stroller illustrated in FIG. 6;

FIG. 9 is a perspective view of the stroller attached to a hard-type carrying case for transporting a bass drum therein and FIG. 10 is a perspective view, with parts broken away, of the stroller attached to another soft-type carrying case.

DESCRIPTION OF THE PREFERRED EMBODIMENTS

Figure 4:
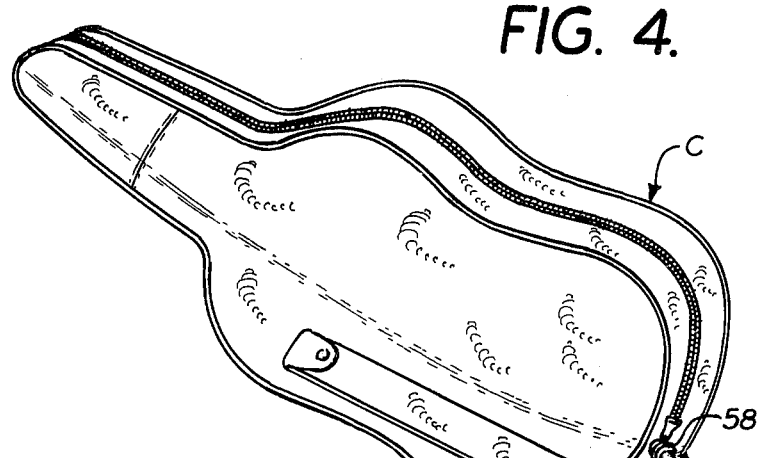
FIG. 4 is a perspective view of the stroller attached to a soft-type carrying case for transporting a bass violin therein.
Figure 1:
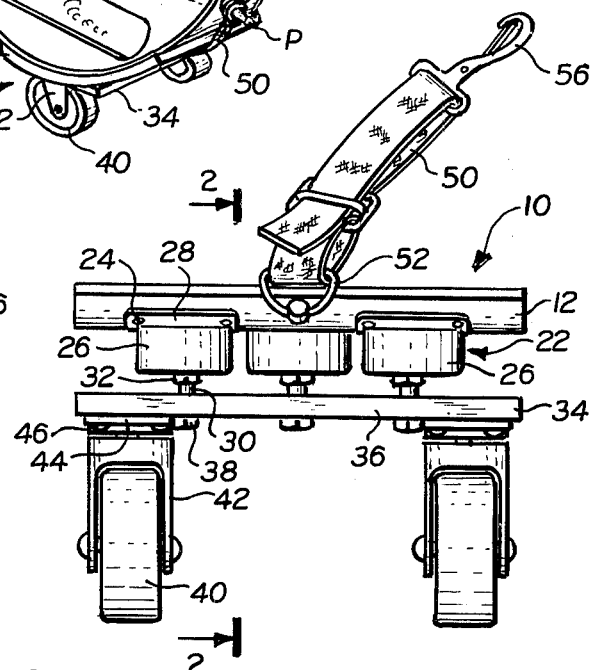
FIG. 1 is a front elevational view of the stroller constructed in accordance with the present invention.

Referring to the drawings, and more particularly to FIGS. 1–5, there is illustrated a stroller 10 constructed in accordance with the present invention. Stroller 10 includes a mounting plate 12 adapted to be removably attached to an outer surface portion of a carrying case represented generally by the letter C. In the drawings, the stroller is illustrated as being mounted to the carrying case of a musical instrument such as a bass violin, cello or bass drum. However, it is to be understood that the references to such musical instruments are merely illustrative and that the invention is not to be deemed limited thereto. Thus, it is within the purview of the present invention to provide a stroller that may be used to transport musical instruments other than those specifically referred to herein. Furthermore, in its broadest application, the stroller of the present invention is adapted to be attached to either a hard-type or soft-type carrying case for transporting any selected or desired article therein.

Mounting plate 12 is preferably formed of aluminum or other lightweight metal having a thickness to permit said plate to be shaped to a configuration complementary to the shape of the carrying case in the region of attachment. For example, referring to FIG. 4, plate 12 is suitably curved with its concave surface engaging the correspondingly shaped curved portion of case C in the region representative of the lower rib portion of the bass violin instrument. In the preferred embodiments, the width of mounting place 12 is equal to or slightly less than the rib dimension of the bass instrument so that said plate will not extend beyond the opposite sides of the carrying case.

Figure 5:
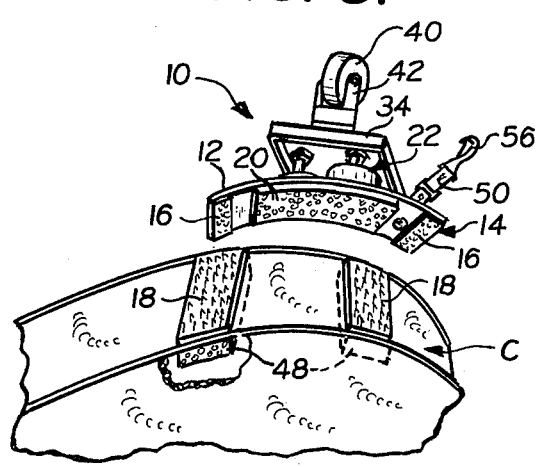
FIG. 5 is another perspective view of the stroller separated from the case, and with the case shown with parts broken away to illustrate the cushioning member positioned on the inner surface thereof.
Figure 2:
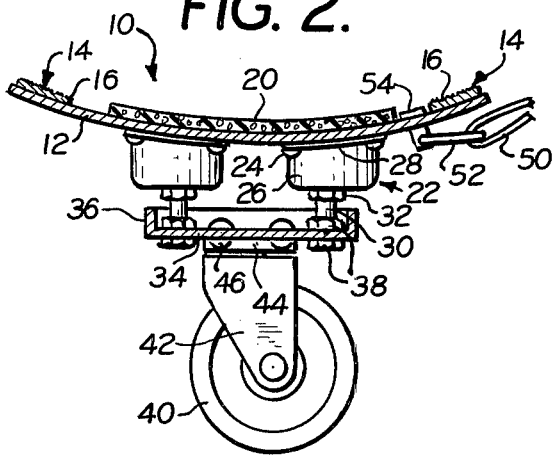
FIG. 2 is a sectional view taken through line 2—2 of FIG. 1.
Figure 3:
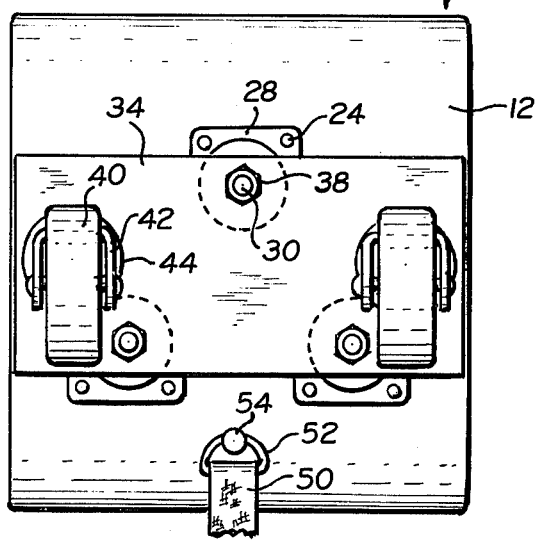
FIG. 3 is a bottom view of the stroller illustrated in FIG. 1.

Mounting plate 12 is attached to carrying case C by a plurality of interengaging fastening means, represented generally by numeral 14. Referring to FIGS. 2 and 5, each of said fastening means 14 includes a portion 16 connected to plate 12 along the end edges of its concave surface by means of adhesive or the like. Portions 16 are each approximately 2.0 inches (5.1 cm.) in width and extend substantially the entire depth or cross-dimension of the plate. Fastening means 14 also includes other portions 18 having the same or a slightly greater width than portions 16, and adapted to be connected to carrying case C by means of adhesives or the like. The dimensions of fastening portions 16, 18 are purely illustrative and are not be be deemed as limitations on the invention. Portions 16 and 18 are adapted to interengage in a manner hereinafter described.

The concave surface of mounting plate 12 is further provided with a cushioning member 20 located between the fastening portions 16. Cushioning member 20, similar to fastening portions 16, extends substantially the entire depth of plate 12 and is adapted to engage with case C upon attachment to the stroller. In the preferred embodiment, cushioning member 20 consists of a sponge rubber material cemented to plate 12 and having a thickness such that it is adapted to be slightly compressed upon attachment of the stroller to the case.

It is proposed to use VELCRO brand VEL-LOC fasteners as the interengaging fastening means 14. More specifically, VEL-LOC fasteners consist of two separable members one of which is made up of a large number of projecting loops of plastic fiber while the other one of said members is made up of a large number of projecting hooks. In the present construction, one of such members is represented by portion 14 connected to plate 12 while the other of said members is represented by portion 18 connected to carrying case C. In operation, the pressing of mounting plate 12 against carrying case C results in the projecting hooks engaging the opposed loops to achieve a tight interlocking connection. The connection can be easily separated by pulling mounting plate 12 in such a manner so that the hooks yield and release the projecting loops. VEL-LOC fasteners are manufactured by American Velcro Inc., Manchester, N.H.

A plurality of shock absorbing members, represented generally by numeral 22, are mounted to the convex surface of mounting plate 12 by means of rivets 24, or the like. In this regard, each one of the shock absorbing members 22 is of elastomeric construction defined by a housing 26 having a base flange portion 28 through which passes the rivets 24. Projecting outwardly and centrally of housing 26 is a threaded shaft or stud 30 which is disposed for axial movement against the force of a restoring membrane (not shown). One end of shaft 30 threaded engages into the restoring membrane and is fixed in position by means of a nut 32 and associated lock washer (not shown). The other or free end of shaft 30 is adapted to engage with a wheel support plate 34 in a manner hereinafter described. In operation, it is proposed to use three such shock absorbing members 22 selectively positioned on mounting plate 12 to provide an effective dampening arrangement with respect to the movement of mounting plate 12 and wheel support plate 34 relative to one another. The specific construction and operation of shock absorbing members 22 are well-known in the prior art and form no part of the present invention. Accordingly, a more detailed description of said members is not deemed necessary. An illustrative type of shock absorbing member readily adapted to be used in the manufacture of the stroller herein is manufactured by the Lord Corporation, Erie, Pa., and identified as Part No. 150PHL-12.

Wheel support plate 34 is preferably formed of aluminum or other lightweight metal and is formed with its side and end edge portions bent upwardly, as viewed in FIG. 2, to define flange portions 36. Wheel support plate 34 is spaced below mounting plate 12 and is connected thereto by means of the free ends of shafts 30 which pass through accommodating openings in wheel support 34 and are fixed in position by means of locking nuts 38 located on opposite sides of plate 34. Thus, mounting plate 12 and wheel support plate 34 are interconnected by means of the shock absorbing members 22. In operation, shock absorbing members 22 are operative between a normally extended condition and a compressed condition to effect relative movement of said plates in directions toward and away from each other. In other words, mounting plate 12 and wheel support plate 34 are disposed for relative movement between a rest position, when shock absorbing members 22 are in their normally extended conditions, and a displaced condition in the direction toward one another, when one or more of said shock absorbing members 22 is in a compressed condition.

A plurality of wheels 40 are rotatably mounted on support plate 34 for 360° swivel movement. Each of said wheels 40 is journaled in a bracket 42 which is rotatably connected to a base plate 44 which, in turn, is mounted to wheel support plate 34 by means of rivets 46 or the like. In the preferred embodiments, the stroller includes a pair of such wheels 40 mounted on support plate 34 in laterally spaced relation adjacent the end edge portions to more easily manipulate the stroller 10 and the attached carrying case C.

Stroller 10 is attached to carrying case C by first connecting the fastening portions 18 to the outer surface of the case in the region of attachment. In this regard, it will be appreciated that the spacing between fastening portions 18 should be such that they will engage with the fastening portions 16 on mounting plate 12 when plate 12 is pressed against the case in the region of attachment.

In those instances where the carrying case C is of the soft or flexible-type, as illustrated in FIGS. 4 and 5, then additional cushioning members 48 may be cemented to the inner surface of the case in the region of attachment. More specifically, each one of said cushioning members 48 is aligned with a separate one of the fastening portions 18 to form the outer members of a sandwich construction having a portion of the case therebetween. Cushioning members 48 provide reinforced backing for fastening portions 18 and also serve to reduce the likelihood of the flexible-type case slipping or sliding over the instrument being carried therein in the region of attachment. In this regard, the cushioning members 48 have a longitudinal extent substantially equal to the corresponding dimension of the fastening portions 18, and have sufficient thickness to frictionally abut against the rib portion of the bass violin when the stroller 10 is in use.

In order to further reduce the likelihood of the soft-type case slipping or sliding over the instrument, particularly in the case of the base violin of FIG. 4, an adjustable strap 50 is provided having one end connected to mounting plate 12 and the other end removably connected to the instrument. In this regard, carrying case C is formed having a bottom opening through which passes the end pin P of the instrument. Strap 50 has one end connected to a ring clasp 52, which in turn, is fixedly connected to mounting plate 12 by means of a rivet 54 or the like. The other end of strap 50 is connected to a spring snap 56 which is adapted to be removably connected to a metal ring 58 positioned over and associated with the end pin P. Adjustment of strap 50 permits the user to take up any slack or play in the flexible case relative to the instrument when the stroller 10 is in use.

FIGS. 6–8 illustrate another embodiment of the invention represented by stroller 10' which is constructed essentially similar to the stroller embodiment of FIGS. 1–5. Stroller 10' is of a smaller dimensional construction than stroller 10 in that it is intended for use in association with small-type instruments. However, in view of the similarities of the two constructions, those component parts which operate and function in the same or similar manner are designated by the same reference numerals so that a detailed description of the same is not deemed necessary.

Referring to FIG. 6, it is possible to replace one of the three shock absorbing members 22 with a plain elastomeric annular member 60 placed in abutting contact to the convex surface of mounting plate 12. An opening is provided in plate 12 through which passes the threaded portion of a bolt 62. The elastomeric member 60 is positioned relative to plate 12 such that the bolt 62 passes through member 60 and receives a washer 64 and lock nut 66 to keep member 60 in place. Bolt 62 then passes through an accommodating opening in wheel support plate 34 and is fixed in position by means of locking nuts 68 located on opposite sides of plate 34.

FIG. 7 illustrates an alternative construction wherein the elastomeric annular member 60' is placed in abutting contact to wheel plate 34 rather than mounting plate 12. In this embodiment, the bolt is represented by numeral 62' having a head portion 70 and a threaded portion 72. The threaded portion is bolt 62' passes through an opening in plate 12 and is fixed in position by means of lock washer 74 and nut 76. The elastomeric member 60' is positioned such that the bolt 62' passes through said member and then through an opening in wheel support plate 34. The arrangement provides for elastomeric member 60' to be sandwiched on one side by wheel plate 34 and on the other side by another washer 78 and nut 80. The threaded portion of bolt 62' extending between nuts 76 and 80 is protected by a sleeve 2. The end of bolt 62' that passes through wheel plate 34 receives a lock washer 84 and nut 86 to complete the assembly. The head portion 70 of bolt 62' is covered by cushioning member 20 to prevent it from damaging or otherwise defacing the carrying case.

FIG. 9 illustrates the stroller 10 or 10' attached to a carrying case C-1 of the hard-type construction for transporting a bass drum. Case C-1 includes a handle H to facilitate movement of the case when the stroller is in use. The manner of attaching the stroller to the case is the same as heretofore described in connection with FIGS. 1–5, with the exception that cushioning member 48 and strap 50 are no longer necessary in view of the hard-type case construction.

FIG. 10 illustrates the stroller 10 attached to a soft-type case C-2 for transporting a bass drum. The manner of attaching the stroller to the case is the same as heretofore described in connection with FIGS. 1–5. In this embodiment, in order to reduce the likelihood of the soft-type case slipping or sliding over the instrument, one or more adjustable straps 90 is provided having one end connected to mounting plate 12 and the other end connected to the outer surface of a backing member 92. The inner surface of member 92 has one of the interengaging portions 94 of a VEL-LOC fastener cemented thereon. The other portion 96 of said fastener is cemented on another backing member 98, which member, in turn, is suitably mounted on the carrying case C-2. The portions 94, 96 are broadly defined as fastening means represented generally by numeral 100 for releaseably connecting backing members 92, 98 together. In operation, the pressing of backing member 92 against backing member 98 serves to interengage the portions 94, 96 to achieve a tight interlocking connection whereupon the strap may then be adjusted to take up any slack or play in the flexible case relative to the instrument when the stroller 10 is in use.

Accordingly, there is thus provided a stroller for attachment to a carrying case which patentably distinguishes over the heretofore known stroller constructions and which satisfies all of the stated objectives. While preferred embodiments of the invention have been shown and described in detail, it will be readily understood and appreciated that numerous omissions, changes and additions may be made without departing from the spirit and scope of the invention.

I claim:

1. A stroller for attachment to a case for transporting an article therein, said stroller comprising:
   a. a mounting plate; and
   b. a wheel support plate;
   c. wheel means rotatably mounted on said support plate for 360° swivel movement;
   d. shock absorbing means having portions respectively mounted on said mounting plate and said support plate for interconnecting said plates together in spaced apart relation, said means being operative between a normally extended condition and a compressed condition to effect relative movement of said plates in directions toward and away from each other;

e. said shock absorbing means being the sole structure for controlling the relative movement between said mounting plate and said wheel support plate, and for controlling the relative spacing between said plates in all directions;

f. one of said plates being disposed for movement between a rest position when said shock absorbing means is in its normally extended condition and a displaced position in the direction toward the other one of said plates when said shock absorbing means is in a compressed condition; and g. separable interengaging fastening means on said mounting plate, said means having a first portion connected to said mounting plate and a second portion adapted to be connected to said case for removably attaching said stroller to said case.

2. The stroller as recited in claim 1, wherein said mounting plate is formed having a shape complementary to the shape of said case in the region of attachment.

3. The stroller as recited in claim 1, further comprising adjustable strap means having one end connected to said mounting plate and the opposite end adapted to be removably connected to the article being transported within said case.

4. The stroller as recited in claim 1, further comprising adjustable strap means having one end connected to said mounting plate and the opposite end adapted to be removably connected to said case.

5. The stroller as recited in claim 1, further comprising cushioning means on said mounting plate adapted to engage with said case upon attachment to said stroller to said case.

6. The stroller as recited in claim 5, further comprising a plurality of said fastening means on said mounting plate; and said cushioning means being located between said fastening means.

7. A stroller for attachment to a case for transporting an article therein, said stroller comprising:
 a. a mounting plate having a shape complementary to the shape of said case in the region of attachment;
 b. a wheel support plate;
 c. a plurality of wheels rotatably mounted on said support plate for 360° swivel movement;
 d. a plurality of shock absorbing members each having portions respectively mounted on said mounting plate and said support plate for interconnecting said plates together in spaced apart relation, said members being operative between a normally extended condition and a compressed condition to effect relative movement of said plates in directions toward and away from each other;
 e. one of said plates being disposed for movement between a rest position when each of said shock absorbing members is in its normally extended condition and a displaced position in the direction toward the other one of said plates when one or more of said shock absorbing members is in a compressed condition;
 f. a plurality of interengaging fastening means on said mounting plate, each of said fastening means having a portion adapted to be connected to said case for removably attaching said stroller to said case; and g. cushioning means on said mounting plate adapted to engage with said case upon attachment of said stroller.

8. The stroller as recited in claim 7, further comprising adjustable strap means having one end connected to said mounting plate and the opposite end adapted to be removably connected to the article being transported within said case.

9. The stroller as recited in claim 7, further comprising adjustable strap means having one end connected to said mounting plate and the opposite end adapted to be removably connected to said case.

10. A case and case stroller combination comprising:
 a. a case adapted to carry an article therein;
 b. a mounting plate having a shape complementary to the shape of said case in the region of attachment;
 c. a wheel support plate;
 d. wheel means rotatably mounted on said support plate for 360° swivel movement;
 e. shock absorbing means having portions respectively mounted on said mounting plate and said support plate for interconnecting said plates together in spaced apart relation, said members being operative between a normally extended condition and a compressed condition to effect relative movement of said plates in directions toward and away from each other;
 f. one of said plates being disposed for movement between a rest position when said shock absorbing means is in its normally extended condition and a displaced position in the direction toward the other one of said plates when said shock absorbing means is in a compressed condition;
 g. interengaging fastening means having portions respectively on said mounting plate and said case for removably attaching said stroller to said case; and
 h. cushioning means on said mounting plate engageable with said case upon attachment of said stroller.

11. The combination as recited in claim 10, wherein said case has an opening to provide access to the article carried therein; and adjustable strap means having one end connected to said mounting plate and the opposite end adapted to be removably connected to said article.

12. The combination as recited in claim 11, wherein said article has a portion projecting through said case opening; said combination further comprising a separable member adapted to be engaged with said portion; and connecting means on said opposite end of said strap means adapted to be removably connected to said member.

13. The combination as recited in claim 10, further comprising adjustable strap means having one end connected to said mounting plate and the opposite end removably connected to said case.

14. The combination as recited in claim 13, further comprising interengaging fastening means having portions respectively connected to said opposite end of said strap and to said case.

15. The combination as recited in claim 10, wherein said case is made of flexible material having an inner and outer surface; and cushioning means on said inner surface in the region of attachment of said stroller to said case.

16. The combination as recited in claim 15, wherein the portion of said fastening means on said case is positioned on said outer surface; and the cushioning means on said case is aligned with said portion of said fastening means to form the outer members of a sandwich having a portion of the case therebetween.

17. A case and case stroller combination comprising:
  a. a flexible case adapted to carry an article therein, said case having an inner and outer surface;
  b. a mounting plate having a shape complementary to the shape of said case in the region of attachment;
  c. a wheel support plate;
  d. wheel means rotatably mounted on said support plate for 360° swivel movement;
  e. shock absorbing means having portions respectively mounted on said mounting plate and said support plate for interconnecting said plates together in spaced apart relation, said members being operative between a normally extended condition and a compressed condition to effect relative movement of said plates in directions toward and away from each other;
  f. one of said plates being disposed for movement between a rest position when said shock absorbing means is in its normally extended condition and a displaced position in the direction toward the other one of said plates when said shock absorbing means is in a compressed condition;
  g. interengaging fastening means having portions respectively on said mounting plate and on the outer surface of said case for removably attaching said stroller to said case;
  h. first cushioning means on said mounting plate engageable with said case upon attachment of said stroller;
  i. second cushioning means on the inner surface of said case in the region of attachment; and
  j. adjustable strap means having one end connected to said mounting plate and the opposite end adapted to be operatively associated with said case to prevent any substantial sliding movement of said case relative to said article when the stroller is in use.

* * * * *